US008113596B2

(12) United States Patent
Lee et al.

(10) Patent No.: US 8,113,596 B2
(45) Date of Patent: Feb. 14, 2012

(54) SOLENOID VALVE FOR BRAKE SYSTEM

(75) Inventors: Sang Cheol Lee, Gyeonggi-do (KR); Chung Jae Lee, Gyeonggi-do (KR); Dong Il Seo, Gyeonggi-do (KR)

(73) Assignee: Mando Corporation, Gyeonggi-do (KR)

( * ) Notice: Subject to any disclaimer, the term of this patent is extended or adjusted under 35 U.S.C. 154(b) by 999 days.

(21) Appl. No.: 12/051,970

(22) Filed: Mar. 20, 2008

(65) Prior Publication Data

US 2009/0121541 A1    May 14, 2009

(30) Foreign Application Priority Data

Nov. 13, 2007 (KR) .......................... 10-2007-0115643

(51) Int. Cl.
*B60T 8/36* (2006.01)
(52) U.S. Cl. ............... 303/119.2; 303/113.1; 303/119.3; 303/199; 137/601.2; 137/601.14; 137/630.14; 251/129.02; 251/129.15
(58) Field of Classification Search ............... 303/119.2, 303/119.3; 251/129.15
See application file for complete search history.

(56) References Cited

U.S. PATENT DOCUMENTS

| 4,783,044 A * | 11/1988 | Ellison ...................... 251/30.02 |
| 6,254,199 B1 * | 7/2001 | Megerle et al. ............ 303/119.2 |
| 6,808,160 B2 * | 10/2004 | Hayakawa et al. ....... 251/129.02 |
| 6,846,049 B2 * | 1/2005 | Obersteiner et al. ....... 303/119.2 |
| 6,908,161 B2 * | 6/2005 | Inagaki et al. ............. 303/119.2 |
| 2006/0076825 A1 * | 4/2006 | Sanada ...................... 303/119.3 |

FOREIGN PATENT DOCUMENTS

| KR | 100594994 B1 | 6/2006 |
| KR | 2007-60524 | 6/2007 |

OTHER PUBLICATIONS

Chinese Office Action issued in Chinese Patent Application No. CN 200810087435.9 dated May 25, 2011.

* cited by examiner

*Primary Examiner* — Robert Siconolfi
*Assistant Examiner* — San Aung
(74) *Attorney, Agent, or Firm* — McDermott Will & Emery LLP

(57) ABSTRACT

A solenoid valve for a brake system, which has a simple constitution and can be easily manufactured with reduced manufacturing costs, is disclosed. A valve core is formed in a cylindrical shape, and has a through-hole formed in a longitudinal direction of the valve core and a fluid passage formed in a radial direction of the valve core so as to communicate with the through-hole. A sleeve is coupled to an outer surface of the valve core. The sleeve has a dome-shaped shielding portion at one end, and a flange portion to be fixed to a modulator block at the other end. An armature is slidably mounted in the sleeve. An exciting coil is provided to move the armature. A valve seat is fixed in the valve core, and has a first orifice. A plunger is mounted in the valve core. The plunger moves by movement of the armature to open or close the first orifice. A restoring spring is provided to press the plunger toward the armature. A filter member is coupled to the valve core to surround an outer surface and an end portion of the valve core, which are to be received in a bore of the modulator block. The filter member includes a filtering part to filter oil, a second orifice to rectify oil flow, and a check valve to permit oil to flow back when braking operation is released.

5 Claims, 3 Drawing Sheets

SOLENOID VALVE FOR BRAKE SYSTEM

CROSS-REFERENCE TO RELATED APPLICATION

This application claims the benefit of Korean Patent Application No. 2007-0115643, filed on Nov. 13, 2007 in the Korean Intellectual Property Office, the disclosure of which is incorporated herein by reference.

BACKGROUND OF THE INVENTION

1. Field of the Invention

The present invention relates to a solenoid valve for a brake system, and more particularly, to a solenoid valve for a brake system capable of being more easily manufactured and reducing manufacturing costs.

2. Description of the Related Art

Generally, an anti-lock brake system for vehicles serves to prevent locking of wheels by sensing slippage of the wheels and suitably controlling braking pressure applied to the wheels. The wheels of the vehicle do not slip during braking by means of the anti-lock brake system, whereby the steering performance of the vehicle is maintained, and the vehicle is stopped safely.

In order to control braking pressure, the brake system includes a plurality of solenoid valves to open or close a fluid path of a braking hydraulic pressure line. The solenoid valves include normal open type solenoid valves which are normally kept in an opened state, and normal close type solenoid valves which are normally kept in a closed state.

FIG. 1 shows a conventional normal open type solenoid valve. A conventional normal open type solenoid valve includes a valve core 1 which is formed with a through-hole 2 at a center thereof in a longitudinal direction and an outlet 3 in a radial direction, a dome-shaped sleeve 4 which is mounted to an upper portion of the valve core 1 to cover the same, an armature 5 which is slidably mounted in the sleeve 4, and an exciting coil 6 which is mounted around the sleeve 4 to slide the armature 5.

Inside the through-hole 2 of the valve core 1 are mounted a plunger 7 which slides by the movement of the armature 5, a valve seat 8 having an orifice 8a which is opened or closed by the plunger 7, and a restoring spring 9 which presses the plunger 7 toward the armature 5 to open the orifice 8a when electric power is not applied to the exciting coil 6.

When electric power is applied to the exciting coil 6, the armature 5 moves toward the valve core 1 by a magnetic force exerted between the armature 5 and the valve core 1. The plunger 7 moving toward the valve seat 8 closes the orifice 8a. When electric power is not applied to the exciting coil 6, the magnetic force is removed, and the plunger 7 moves away from the valve seat 8 by an elastic force of the restoring spring 9, thereby opening the orifice 8a. By the orifice 8a being repeatedly closed and opened by the movement of the plunger 7, the solenoid valve intermits oil supply flowing through the braking hydraulic pressure line.

When the braking operation is performed, oil flows into the solenoid valve through an inlet passage formed in a lower portion of the valve core 1, and then flows toward the outlet 3 formed at a side portion of the valve core 1 via the orifice 8a. When the braking operation is released, the oil flows through a gap between an outer lower surface of the valve core 1 and an inner surface of a bore 12 of a modulator block 11, as shown by an arrow A in FIG. 1, so that the oil can rapidly return. To achieve this, a lip-seal 13 is mounted on the outer lower surface of the valve core 1, which permits the oil flow only in the return direction.

However, the above-described conventional solenoid valve has a shortcoming of difficulty in manufacture due to a complicated shape of the valve core. That is, when manufacturing the valve core, a plurality of stair-shaped stepped portions should be formed on the outer surface of the valve core through a cutting process, and also the through-hole and the outlet should be formed in the valve core through a cutting process. This causes problems of difficulty in manufacture and high manufacturing costs.

Further, because the sleeve is coupled to the valve core through a welding process, the above-described conventional solenoid valve also has shortcomings of high work effort and low assembling productivity.

SUMMARY OF THE INVENTION

Therefore, it is an aspect of the invention to provide a solenoid valve for a brake system, which has a simple constitution and can be easily manufactured with reduced manufacturing costs.

Additional aspects and/or advantages of the invention will be set forth in part in the description which follows and, in part, will be obvious from the description, or may be learned by practice of the invention.

In accordance with an aspect of the invention, there is provided a solenoid valve for a brake system, comprising: a valve core formed in a cylindrical shape, the valve core having a through-hole formed in a longitudinal direction of the valve core and a fluid passage formed in a radial direction of the valve core so as to communicate with the through-hole; a sleeve coupled to an outer surface of the valve core, the sleeve having a dome-shaped shielding portion at one end and a flange portion to be fixed to a modulator block at the other end; an armature slidably mounted in the sleeve; an exciting coil to move the armature; a valve seat fixed in the valve core, the valve seat having a first orifice; a plunger mounted in the valve core, the plunger moving by movement of the armature to open or close the first orifice; a restoring spring to press the plunger toward the armature; and a filter member coupled to the valve core to surround an outer surface and an end portion of the valve core, which are to be received in a bore of the modulator block, the filter member including a filtering part to filter oil, a second orifice to rectify oil flow, and a check valve to permit oil to flow back when braking operation is released.

The filter member may include a peripheral portion surrounding the outer surface of the valve core and provided with the filtering part, and a supporting portion formed integrally with the peripheral portion, near the end portion of the valve core, and having a connecting passage connected with the through-hole.

The second orifice may be provided in the connecting passage.

The supporting portion of the filter member may be formed with a return passage to return oil therethrough when braking operation is released. The check valve may include an opening/closing ball movably mounted in the return passage. When braking operation is performed, the opening/closing ball may close the return passage, and when braking operation is released, the opening/closing ball may open the return passage.

The valve core may have a coupling recess on the outer surface thereof, and the sleeve may have a latching portion formed by deformation of the sleeve. The sleeve may be coupled to the valve core by the latching portion being fitted into the coupling recess and latched by the coupling recess by deformation of the sleeve.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
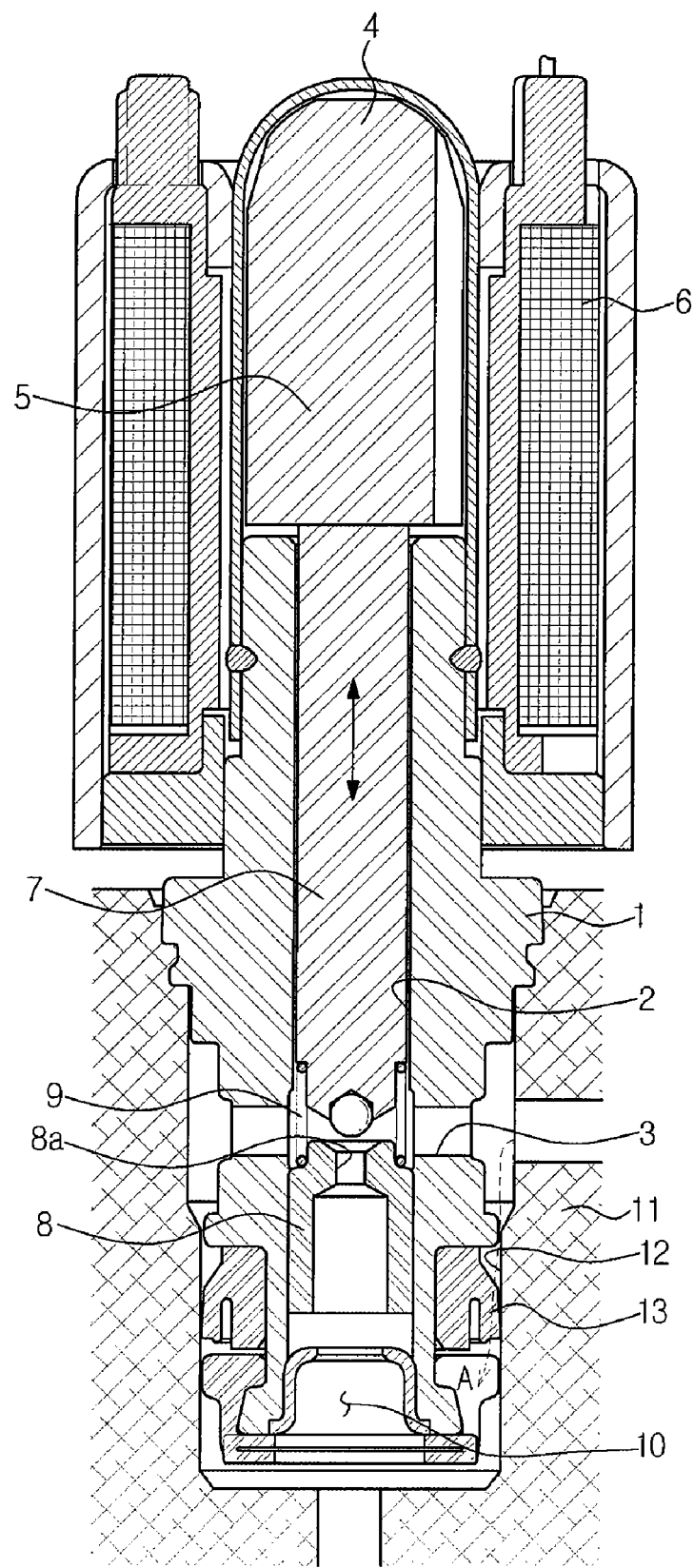
FIG. 1 is a sectional view of a conventional solenoid valve for a brake system.

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 2:
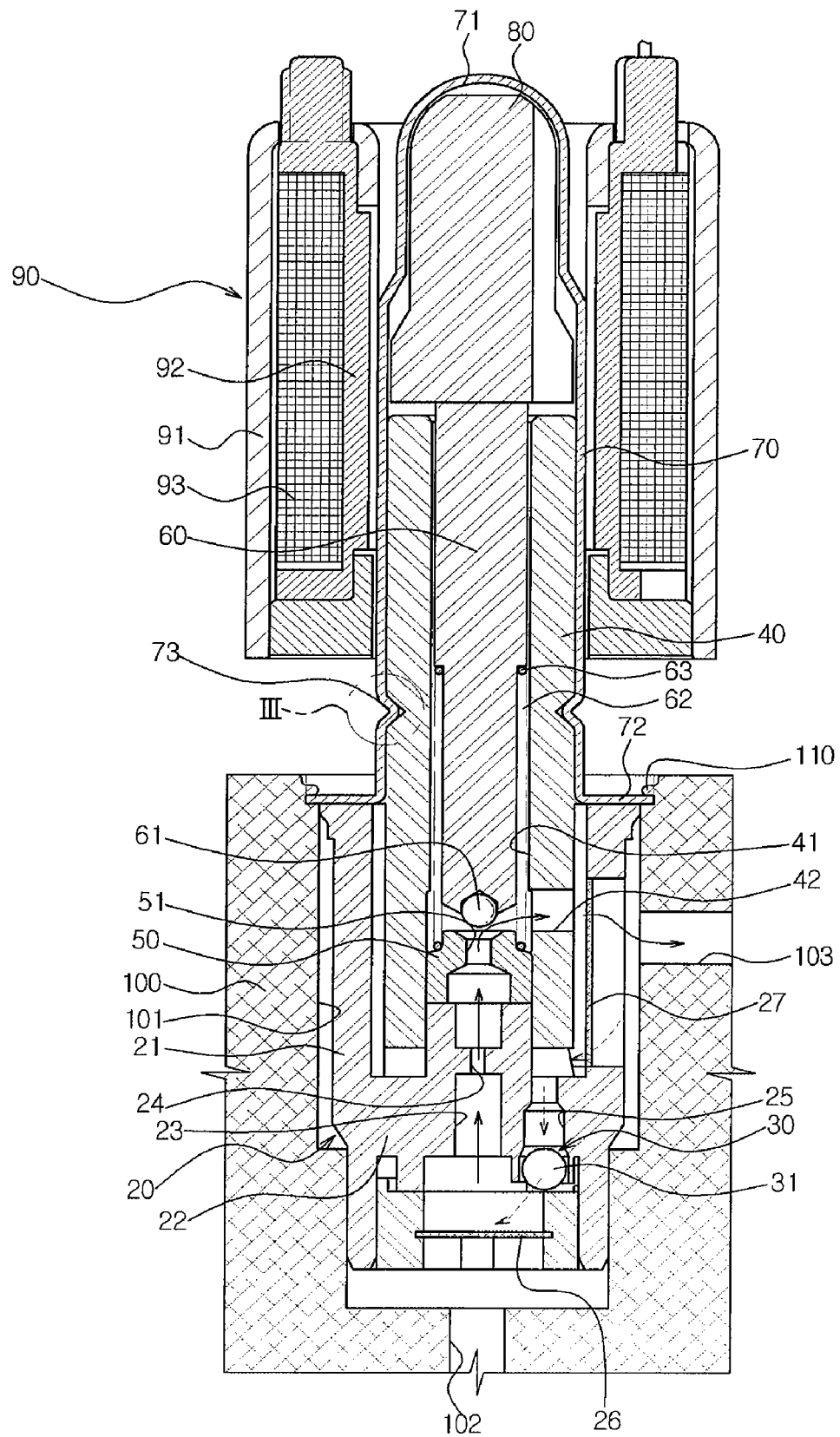
FIG. 2 is a sectional view of a solenoid valve for a brake system according to the present invention.

A solenoid valve for a brake system according to the present invention, as shown in FIG. 2, comprises a filter member 20 accommodated in a bore 101 of a modulator block 100, a valve core 40 coupled to the filter member 20, a valve seat 50 and a plunger 60 mounted in the valve core 40, a sleeve 70 coupled to an outer portion of the valve core 40, an armature 80 mounted in the sleeve 70, and an exciting coil assembly 90 mounted around the sleeve 70.

The valve core 40 is formed in a cylindrical shape, and has a through-hole 41 formed through the valve core 40 in a longitudinal direction and a fluid passage 42 formed in a radial direction so as to communicate with the through-hole 41. A valve seat 50 formed with a first orifice 51 is press-fitted in the through-hole 41 of the valve core 40.

The filter member 20 is first coupled to the valve core 40, and then is inserted into the bore 101 of the modulator block 100. The filter member 20 includes a peripheral portion 21 surrounding an outer lower surface of the valve core 40, and a supporting portion 22 positioned near a lower end of the valve core 40 and formed integrally with the peripheral portion 21. The peripheral portion 21 receives a lower portion of the valve core 40. An outer surface of the supporting portion 22 is supported by an inner surface of the bore 101 of the modulator block 100. The supporting portion 22 is formed with a connecting passage 23 at a center thereof, which is connected with the through-hole 41 of the valve core 40, and a return passage 25 next to the connecting passage 23. A second orifice 24 is formed in the connecting passage 23 to rectify the oil flow. The supporting portion 22 of the filter member 20 is provided with a first filtering part 26 to filter out foreign substances from the oil introduced through an inlet passage 102 of the modulator block 100. The peripheral portion 21 of the filter member 20 is provided with a second filtering part 27 to filter out foreign substances from the oil discharged toward an outlet passage 103 via the first orifice 51.

The return passage 25 formed in the filter member 20 serves to permit the oil to flow back when the braking operation is released. A check valve 30 is mounted in the return passage 25. The check valve 30 includes an opening/closing ball 31 which is mounted in the return passage 25 so as to move forward and back. When the braking operation is performed, the opening/closing ball 31 closes the return passage 25. When the braking operation is released, the opening/closing ball 31 opens the return passage 25. Since the check valve 30 has durability higher than a conventional lip-seal, life of the solenoid valve can be extended.

The plunger 60 mounted in the through-hole 41 can move up and down above the valve seat 50. The plunger 60 is provided with an opening/closing part 61 at its lower end to open or close the first orifice 51. The plunger 60 is pressed toward the armature 80 by a restoring spring 62 so as to open the first orifice 51 when electric power is not applied to the exciting coil assembly 90. A lower end of the restoring spring 62 is supported by the valve seat 50, and an upper end of the restoring spring 62 is supported by a stepped portion 63 formed at the outer surface of the plunger 60.

Figure 3:
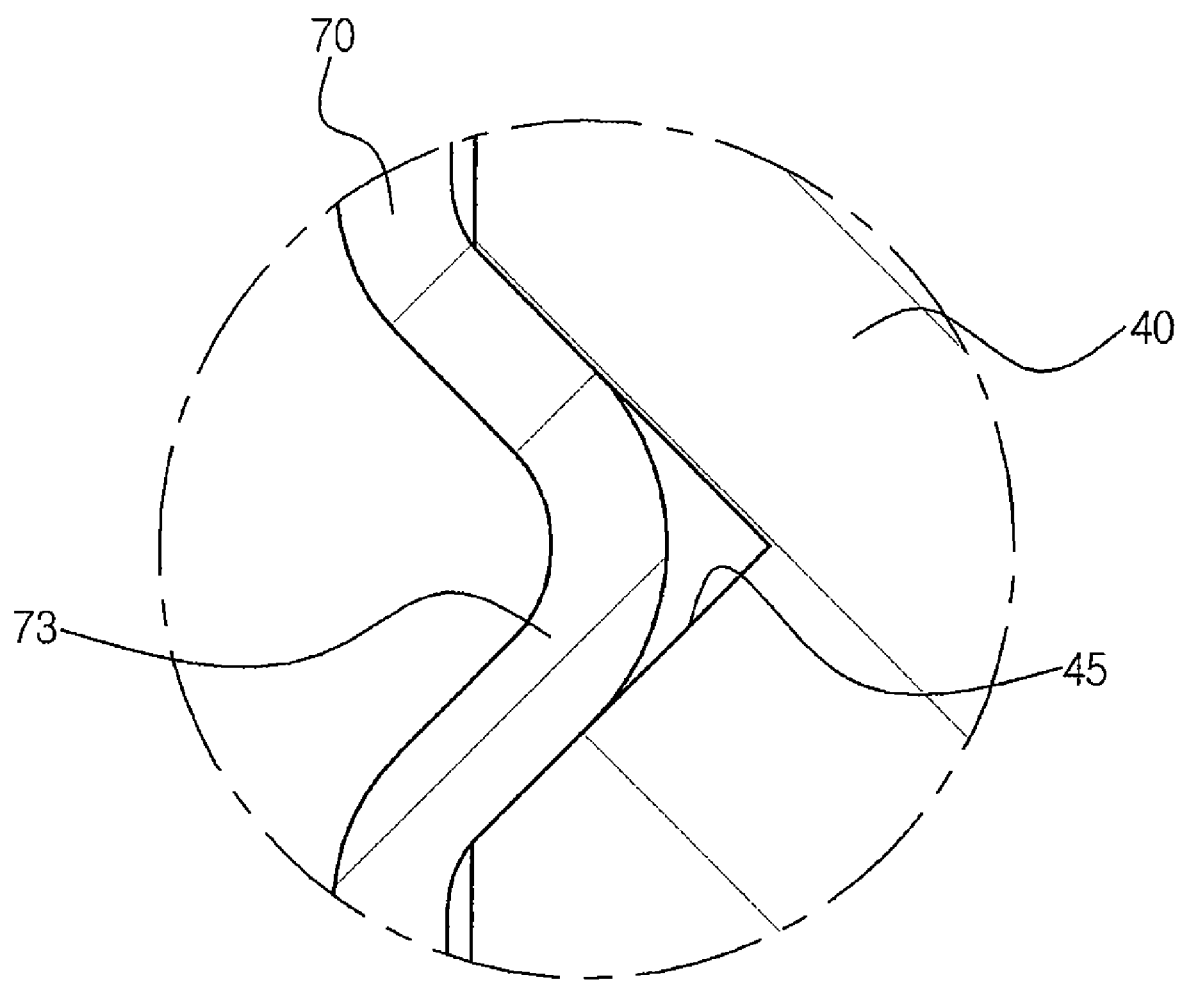
FIG. 3 is a detailed view of a III portion in FIG. 2.

The sleeve 70 has a cylindrical shape, and is coupled to the outer surface of the valve core 40. The sleeve 70 includes a dome-shaped shielding portion 71 formed at an upper portion of the sleeve 70 to shield the upper portion of the valve core 40, and a flange portion 72 formed at a lower end of the sleeve 70 so as to be fixed to an inlet of the bore 101 of the modulator block 100. In order to couple the sleeve 70 to the valve core 40, as shown in FIG. 3, the valve core 40 is formed with a coupling recess 45 along the outer peripheral surface of the valve core 40, and the sleeve 70 is provided with a latching portion 73 which is formed by deformation of the sleeve 70 so as to be fitted into the coupling recess 45 and latched by the coupling recess 45. In other words, the sleeve 70 can be fixed to the valve core 40 in such a manner that the valve core 40 is first inserted into the sleeve 70 and then the latching portion 73 is formed by deformation of the sleeve 70. When compared to a conventional welding process, the above coupling structure can facilitate the coupling of the sleeve 70 and the valve core 40, and can simplify the coupling process.

The armature 80 mounted in the upper portion of the sleeve 70 can move up and down. When electric power is applied to the exciting coil assembly 90, the armature 80 moves to press the plunger 60 so as to close the first orifice 51.

The exciting coil assembly 90 is provided in a cylindrical shape, and is coupled to the outer upper surface of the sleeve 70. The exciting coil assembly 90 includes a cylindrical-shaped coil case 91, a bobbin 92 accommodated in the coil case 91, and an exciting coil 93 wound on an outer surface of the bobbin 92. When electric power is applied to the exciting coil 93, a magnetic field is generated, so that the armature 80 is moved toward the valve core 40 to press the plunger 60, thereby closing the first orifice 51.

When intending to mount the solenoid valve to the modulator block 100, first, the valve core 40, the filter member 20, the valve seat 50, the plunger 60 and the sleeve 70 are all assembled at the exterior of the modulator block 100. Thereafter, the filter member 20 and the valve core 40 are introduced into the bore 101 of the modulator block 100. In such a state, the inlet portion of the bore 101 of the modulator block 100 is deformed. By doing so, a deformed portion 110 of the modulator block 100 is formed to cover the flange portion 72 of the sleeve 70, so as to fix the sleeve 70. Through the above processes, the installation of the valve is achieved.

Since the valve core 40 is provided in a simple cylindrical shape, the solenoid valve according to the present invention has advantages of decrease in the manufacturing processes of the valve core 40 and enhancement of productivity. Further, since the flange portion 72 of the sleeve 70 coupled to the outer surface of the valve core 40 is directly fixed to the modulator block 100, the assembling process can be easily performed. That is, because an additional welding process is not required to couple the valve core 40 and the sleeve 70, the manufacturing processes can be simplified. Still further, the valve core 40 and the sleeve 70 can be easily coupled to each other by means of the coupling recess 45 and the latching portion 73 formed by the deformation of the sleeve 70. Accordingly, the solenoid valve of this embodiment has a simple constitution, and can be easily manufactured. As a result, manufacturing costs can be reduced.

The opening/closing operation of the solenoid valve according to the present invention will now be explained.

When electric power is not applied to the exciting coil assembly 90, because the restoring spring 62 pushes the plunger 60 toward the armature 80, the opening/closing part 61 of the plunger 60 is spaced apart from the first orifice 51. Thus, the first orifice 51 is kept in an opened state. Accordingly, the oil introduced through the inlet passage 102 flows to the outlet passage 103 via the connecting passage 23 of the filter member 20, the second orifice 24, the first orifice 51 and the fluid passage 42 in the radial direction of the valve core 40.

When electric power is applied to the exciting coil assembly 90, the armature 80 is moved toward the valve core 40 against the elastic force of the restoring spring 62 by the magnetic force exerted between the armature 80 and the valve core 40. Accordingly, the plunger 60 is moved toward the first orifice 51 to close the first orifice 51, so that the oil cannot flow.

As apparent from the above description, the solenoid valve according to the present invention can decrease the manufacturing processes of the valve core, because the valve core is provided in a simple cylindrical shape. Accordingly, the solenoid valve can be easily manufactured with reduced manufacturing costs. Productivity also can be enhanced.

Further, since the flange portion of the sleeve coupled to the outer surface of the valve core is directly fixed to the modulator block, and the valve core and the sleeve are coupled by means of the coupling recess and the latching portion, the solenoid valve according to the present invention can be easily assembled.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A solenoid valve for a brake system, comprising:
    a valve core formed in a cylindrical shape, the valve core having a through-hole formed in a longitudinal direction of the valve core and a fluid passage formed in a radial direction of the valve core so as to communicate with the through-hole;
    a sleeve coupled to an outer surface of the valve core, the sleeve having a dome-shaped shielding portion at one end and a flange portion to be fixed to a modulator block at the other end;
    an armature slidably mounted in the sleeve;
    an exciting coil to move the armature;
    a valve seat fixed in the valve core, the valve seat having a first orifice;
    a plunger mounted in the valve core, the plunger moving by movement of the armature to open or close the first orifice;
    a restoring spring to press the plunger toward the armature; and
    a filter member coupled to the valve core to surround an outer surface and an end portion of the valve core, which are to be received in a bore of the modulator block, the filter member including a filtering part to filter oil, a second orifice to rectify oil flow, and a check valve to permit oil to flow back when braking operation is released,
    wherein said flange portion engages the filter member.

2. The solenoid valve according to claim 1, wherein the filter member includes a peripheral portion surrounding the outer surface of the valve core and provided with the filtering part, and a supporting portion formed integrally with the peripheral portion, near the end portion of the valve core, and having a connecting passage connected with the through-hole.

3. The solenoid valve according to claim 2, wherein the second orifice is provided in the connecting passage.

4. The solenoid valve according to claim 2, wherein the supporting portion of the filter member is formed with a return passage to return oil therethrough when braking operation is released,
    and wherein the check valve includes an opening/closing ball movably mounted in the return passage,
    whereby when braking operation is performed, the opening/closing ball closes the return passage, and
    when braking operation is released, the opening/closing ball opens the return passage.

5. The solenoid valve according to claim 1, wherein the valve core has a coupling recess on the outer surface thereof, and
    the sleeve has a latching portion formed by deformation of the sleeve,
    whereby the sleeve is coupled to the valve core by the latching portion being fitted into the coupling recess and latched by the coupling recess by deformation of the sleeve.

* * * * *